May 4, 1965 R. R. BARNES 3,182,132

DOPPLER FREQUENCY SHIFT CORRECTION OF INFORMATION BAND FREQUENCIES IN A SUPPRESSED CARRIER SYSTEM USING A PAIR OF PILOT SIGNALS

Filed July 17, 1962 2 Sheets-Sheet 1

INVENTOR
R. R. BARNES
BY G. E. Hirsch Jr.
ATTORNEY

May 4, 1965 R. R. BARNES 3,182,132
DOPPLER FREQUENCY SHIFT CORRECTION OF INFORMATION BAND FREQUENCIES IN A SUPPRESSED CARRIER SYSTEM USING A PAIR OF PILOT SIGNALS
Filed July 17, 1962 2 Sheets-Sheet 2

INVENTOR
R. R. BARNES
BY
G. E. Hirsch Jr.
ATTORNEY

United States Patent Office 3,182,132

Patented May 4, 1965

3,182,132

DOPPLER FREQUENCY SHIFT CORRECTION OF INFORMATION BAND FREQUENCIES IN A SUPPRESSED CARRIER SYSTEM USING A PAIR OF PILOT SIGNALS

Richard R. Barnes, Stirling, N.J., assignor to Bell Telephone Laboratories, Incorporated, New York, N.Y., a corporation of New York Filed July 17, 1962, Ser. No. 210,460
6 Claims. (Cl. 179—15)

Figure 2:
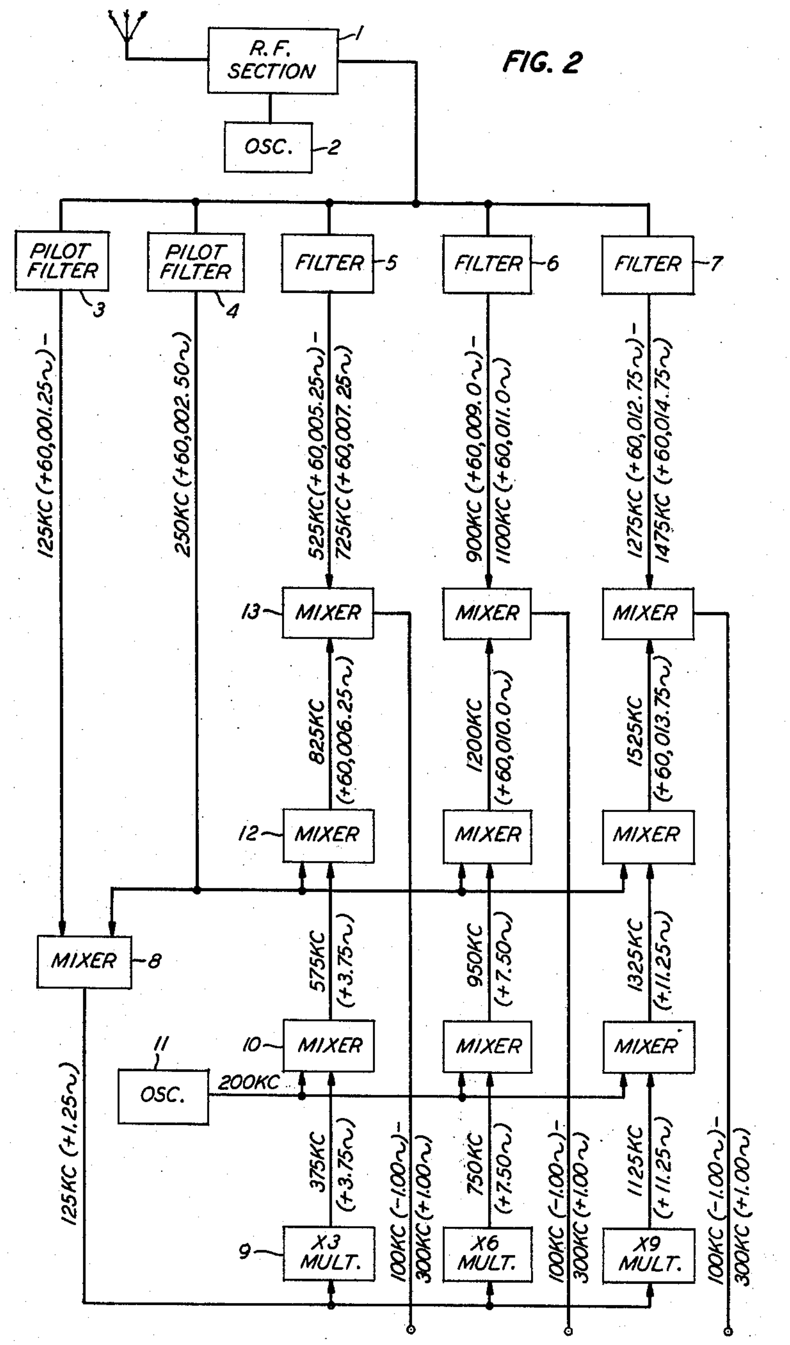

This invention relates to communication systems and more particularly to communication systems having a variable path length between receiving and transmitting stations.

In a communication system there may be a variable path length between the receiving and transmitting stations because of the movement of either the transmitter or receiver or of a moving intermediate repeater station. This is true in communications between a ground station and an aircraft and it is also true in satellite communication systems where the satellite is acting as a repeater station.

It is well known that whenever there is a variable path length in a communication system there is a shift in frequency of the signals coupling the transmitting and receiving stations, which is usually called "Doppler frequency shift." This Doppler frequency shift has a definite relationship to the frequency of the signals coupling the stations and the relative velocity or the rate of change of path length between the stations. With the advent of supersonic aircraft, this Doppler frequency shift can be of such a magnitude as to make the communication signal unusable at the craft in a standard type of receiver, because of the distortion caused by the unequal frequency shifts over the frequency band employed.

Additionally, as the speed of aircraft is increased, it may become necessary to control the flight of the craft by remote control by communication signals from a ground station. This communication signal would probably be a combination of pulses, such as is used in data communication and therefore would be very sensitive to any shift in frequency.

It is noted that a frequency shift problem might also exist in a communication system as a result of inaccuracies in the frequency of the demodulating carrier. Such a frequency shift and its correction are discussed in United States Patents 2,724,742 and 2,778,877. This type of frequency shift is the same for all transmitted frequencies because it is not frequency dependent. On the other hand, the frequency shift attributable to changing path length or Doppler frequency shift bears a direct relationship to the frequency of the signals and therefore requires a different method for its correction.

Doppler frequency shift will occur at all frequencies, that is, at the carrier frequency and also at the modulating frequencies. Therefore, if, for example, the carrier frequency is 6000 megacycles per second and the modulating frequencies occupy a band between 300 and 500 kilocycles per second and the relative velocity between the transmitting and receiving stations of the system is 6,704 miles per hour, there will be a large frequency shift of approximately 60,000 cycles per second attributable to the carrier frequency and a smaller frequency shift between three cycles per second and five cycles per second attributable to the modulating frequencies.

In any communication system having a Doppler frequency shift problem, an important consideration in the removal of this Doppler frequency shift is whether or not a component of the original carrier signal is present at the receiver.

The difference between systems having the carrier present at the receiver and those where the carrier is suppressed, is a characteristic of the type of receiver required and the type of conversion employed. For example, in a communication system where the carrier is frequency modulated and appears at the receiver, conversion will normally be performed by a discriminator circuit which has a broadband characteristic. Due to this characteristic the large frequency shift attributable to the carrier signal will not appear in the output of the discriminator circuit. However, the small frequency shifts attributable to the modulating frequencies are so related to the modulating frequencies that they will not be removed by the discriminator circuit, but will appear in the output thereof. A discussion of the remaining frequency shifts and arrangements for their correction appear in my copending application Serial No. 210,459, filed July 17, 1962.

On the other hand, in a communication system where the carrier is amplitude modulated and only a single sideband is transmitted so that no carrier appears at the receiver, the initial conversion of frequencies within the receiver will generally not remove the large frequency shift attributable to the frequency of the carrier signal. When such a single-sideband signal is employed, the large Doppler frequency shift presents a problem in addition to the small frequency shifts attributable to the modulating frequencies.

Therefore, it is an object of this invention to eliminate the Doppler shift occurring in communication systems having a variable path length between the transmitting and receiving stations and particularly to eliminate the large shifts referred to above as being related to the carrier signal frequency.

Additionally, it is an object of this invention to eliminate the small frequency shifts referred to above which are caused by the modulating signal components.

In accordance with the invention, the frequency shift of the single-sideband signal received by the receiver, which is attributable to the carrier signal frequency, is substantially canceled by providing a pilot signal which modulates the carrier signal along with the modulating frequencies of the information-carrying signals and appears at the receiver with a Doppler frequency shift attributable to both the carrier frequency and its own frequency. The pilot signal and the modulating frequencies which may be composed of several discrete frequency bands are separated by filtering means and thereafter coupled to individual channels. The pilot signal is combined or intermodulated with each band of information-carrying signals to cancel the large frequency shift attributable to the frequency of the carrier signal.

However, this removal of the large Doppler frequency shift does not substantially affect the small frequency shift of each band of information-carrying signals. Therefore, in accordance with the invention, both Doppler frequency shifts are substantially canceled by providing a pair of pilot signals which modulate the carrier signal along with the modulating frequency. The pilot signals will appear at the receiver with a large frequency shift attributable to the carrier signal plus small frequency shifts of their own. The pilot signals and the modulating signals are then separated and coupled to individual channels. The pilot signals are thereafter combined or intermodulated to cancel the large frequency shift attributable to the frequency of the carrier signal. This combined signal thereafter has its frequency increased by a plurality of multiplier circuits to preselected frequencies which are employed as demodulating signals similar to the single pilot frequency in my above-mentioned copending application. In each channel having a discrete band of modulating frequencies there is located a mixer or conversion circuit for combining one pilot signal and one of the preselected frequencies of the combined signal. This preselected frequency will now be chosen to have a frequency shift, which is substantially equal to the average frequency shift in the frequency band of the modulating frequencies of that particular channel. The output of this mixer is then combined with the frequency band of the particular modulating frequencies in a second mixer or conversion circuit to cancel the large frequency shift and to substantially remove any small frequency shift.

Additionally, in accordance with the invention, the large Doppler frequency shift attributable to the carrier signal may be removed from the modulating frequencies of the bands of information-carrying signals prior to their separation into individual channels, thereby permitting each individual channel to have a smaller frequency bandwidth and reducing the required separation between channels.

Accordingly, the pilot signals are separated from the information-carrying signals and one of the pilot signals is thereafter intermodulated with the information-carrying signals to remove the frequency shift common to both. The information-carrying signals are then separated into the individual bands and coupled to individual channels. The pilot signals are also combined to remove the large frequency shift therefrom and to provide a demodulating signal for the removal of the frequency shift in each channel attributable to the band of information-carrying signals in that channel. The combined pilot signal is multiplied by a plurality of multiplier circuits to provide preselected frequencies which have a frequency shift substantially equal to the average frequency shift of a particular band of information-carrying signals. Thereafter, in each channel of information-carrying signals, the particular band of signals therein is intermodulated with a preselected frequency to substantially cancel any remaining frequency shift.

Figure 1:
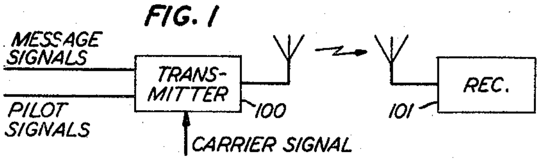
Figure 3:
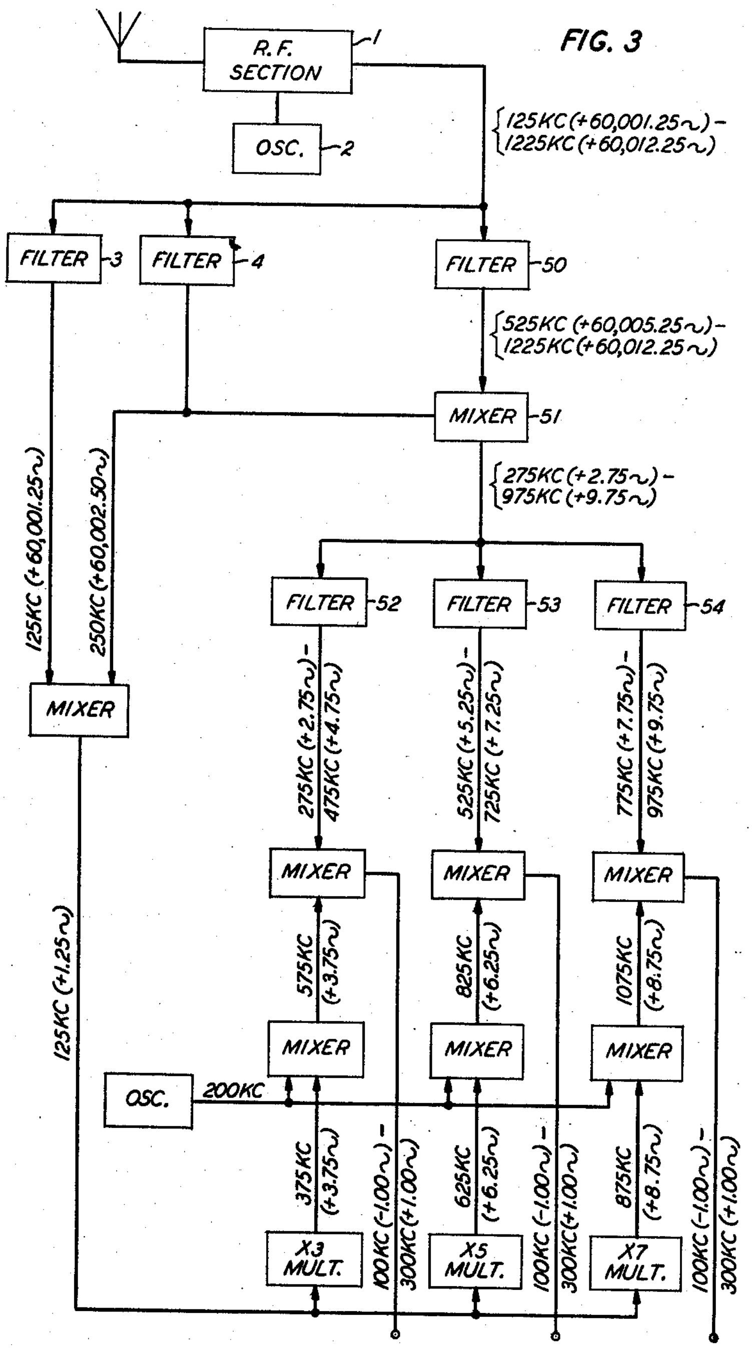

These and other features and advantages of the invention will appear more clearly and fully upon consideration of the following specification when taken in connection with the drawing in which:

FIG. 1 is a block diagram of a communication system in accordance with the invention;

FIG. 2 is a detailed block diagram of a receiver according to the invention and illustrates the possible circuit arrangements at the receiver of the communication system of FIG. 1 to substantially eliminate the Doppler frequency shift in the received signals; and FIG. 3 is a block diagram of a receiver according to the invention and illustrates an alternative circuit arrangement for the receiver of FIG. 1 to compensate for Doppler frequency shift.

The communication system of FIG. 1 comprises a transmitter 100 and a receiver 101, with a varying transmission path length separating them. A carrier signal is supplied to the transmitter, wherein the carrier is modulated by information-carrying or message channels and two pilot signals. The carrier signal is thereafter suppressed and a single sideband of the modulated wave is transmitted.

As the modulated wave travels between the transmitter 100 and the receiver 101 over the varying path length therebetween, there will be a Doppler frequency shift introduced. This Doppler frequency shift may be eliminated at the receiver of the system by employing the receiver shown in either FIG. 2 or FIG. 3 for the receiver 101.

The radio receiver of FIG. 2 comprises a radio-frequency section 1 and an oscillator 2 associated therewith to perform the first conversion of the received signals. The frequency of the output signal from the radio-frequency section 1 will be determined by the frequencies of the modulating signals and the frequency of the carrier signal and the conversion frequency of oscillator 2. For illustrative purposes, it will be assumed that the received single-sideband signal comprises a plurality of information-carrying modulating frequencies occupying discrete frequency bands and a first pilot signal and a second pilot signal. It is further assumed that the carrier signal modulated at the transmitter has a frequency of 6,000 megacycles per second and the modulating frequencies occupy a frequency band of 200 kilocycles per second and are spaced 175 kilocycles per second apart. The first pilot signal has a frequency of 125 kilocycles per second and the second pilot signal has a frequency of 250 kilocycles per second. It is additionally assumed that the relative velocity between the transmitting and receiving stations is approximately 6,704 miles per hour.

Doppler frequency shift may be determined by the following equation:

$$f_D = \frac{V f_c}{c}$$

where $f_D$ equals the Doppler frequency shift, V represents the relative velocity between the transmitting and receiving stations, $f_c$ represents the frequency of the signal coupling the stations and $c$ represents the velocity of light. At the above assumed frequencies and velocities, it is seen from the equation that the Doppler frequency shift attributable to the carrier frequency is 60,000 cycles per second or one part in 100,000 cycles per second. Therefore, it is seen that this relative velocity will also produce a Doppler frequency shift of one part in 100,000 cycles per second at each modulating frequency and pilot signal frequency.

The Doppler frequency shifts attributable to each pilot signal and the limits of the bands of information-carrying signals and the carrier signal are shown in the drawing in parentheses adjacent to or immediately below the original frequencies of the pilot signals and information-carrying signals.

The signal appearing at the output of radio-frequency section 1 of FIG. 2 is separated into the pilot signals and the discrete frequency bands of the information-carrying signals by filters 3 through 7. It is to be noted that the bandwidths of the filters must be wide enough to permit the pilot signal or discrete frequency band plus any Doppler frequency shift that may be present to pass therethrough. Therefore, the frequency band separating the filters located in the information-carrying signal channels must be equal to at least twice the largest Doppler frequency shift expected to occur. For illustrative purposes, it will be assumed herein that the largest Doppler frequency shift will be 60,000 cycles per second so that the high frequency cutoff of one filter and the low frequency cutoff of the adjacent filter must be separated by at least 120 kilocycles per second.

The large Doppler frequency shift of 60,000 cycles per second may be canceled in each information-carrying signal channel by intermodulating one of the pilot signals with each band of signals in the channels. For example, the modulating frequencies of information-carrying signals between 525 kilocycles per second and 725 kilocycles per second appearing at the output of filter 5 may be intermodulated with the 250 kilocycle per second pilot signal appearing at the output of filter 4. Prior to this intermodulation, this 250 kilocycle per second pilot signal may be combined with another signal to produce a signal for cancellation of both the large and small frequency shifts. To effect this cancellation of both frequency shifts it is necessary that the signal have a large frequency shift equal to the large Doppler frequency shift and a small frequency shift equal to the average frequency shift in the particular channel of application.

This signal with which the 250 kilocycle per second pilot signal is combined is produced by intermodulating the two pilot signals in a mixer 8 so that the large Doppler shift present in both pilot signals will be canceled. The output of mixer 8 will have a small frequency shift of 1.25 cycles per second which is attributable to the difference frequency of the two pilot signals. This signal is thereafter increased to a selected value as determined by the modulating frequencies transmitted by each individual channel. For example, the channel carrying the 525 kilocycle to 725 kilocycle band of modulating frequencies will have a small Doppler shift between 5.25 cycles per second and 7.25 cycles per second, so that the average small Doppler shift is 6.25 cycles per second. Therefore, the selected value for the combined pilot signal will be a signal that has a small frequency shift of 6.25 cycles per second. Since the second pilot signal of 250 kilocycles per second, which has a small Doppler shift of 2.50 cycles per second, may be added to the selected frequency to produce the small frequency shift of 6.25 cycles per second, it is necessary for the combined signal to have only a small frequency shift of 3.75 cycles per second. Therefore, the combined signal will be multiplied by a factor of 3 by a multiplier 9 to produce a signal having a frequency of 375 kilocycles per second and a small frequency shift of 3.75 cycles per second.

The output of multiplier 9 is then intermodulated in mixer 10 with the output of an oscillator 11, which is provided to produce a signal that, when combined with the 250 kilocycle per second pilot signal, will have a frequency greater than the frequency band of information-carrying signals in that channel by a desired amount. The output signal of mixer 10 is then combined with the 250 kilocycle per second pilot signal in mixer 12 to produce a signal having a frequency of 825 kilocycles per second and a frequency shift of 60,006.25 cycles per second. This signal is then intermodulated with the frequency band in that channel in mixer 13 to produce an output signal having a frequency band between 100 kilocycles per second and 300 kilocycles per second. This output signal now has a substantially reduced frequency shift of one cycle per second at both ends of the band and of 0 cycle per second at the midpoint of the frequency band. The output signals may now be coupled to utilization circuits if the receiver is located at a termination point of a radio transmission system or that may be coupled to a radio transmitter if the receiver is located at a repeater point in a radio system.

As noted above, the frequency band separating the filters in the information-carrying channels must be equal to at least twice the largest Doppler frequency shift anticipated. Therefore, this requirement results in a waste of frequency spectrum. However, by intermodulating one of the pilot signals with the information-carrying signals prior to their separation into separate channels, the large Doppler frequency shift may be removed so that the channels may be spaced closer together.

An alternative circuit for performing the above operation is shown in FIG. 3. The components common to the arrangements of FIG. 2 and FIG. 3 have the same reference numbers. The output signal from radio-frequency section 1 is now assumed to have a frequency range from 125 kilocycles per second to 1225 kilocycles per second with the pilot signals again being 125 kilocycles per second and 250 kilocycles per second. The pilot signals and the information-carrying signals of the modulating frequencies are separated by filters 3 and 4 and a filter 50, which has a low frequency cutoff above the frequencies of the two pilot signals.

For illustrative purposes it is assumed that there are three discrete frequency bands of information-carrying signals in the frequency range between 525 kilocycles per second and 1225 kilocycles per second. The output signal from filters 3, 4, and 50 will contain the large Doppler frequency shift attributable to the carrier frequency and also a small Doppler frequency shift attributable to the frequencies of the signals passed therethrough. Therefore, if one of the pilot signals having the large Doppler frequency shift is intermodulated in a mixer circuit 51 with the information-carrying signals appearing at the output of filter 50, it is possible to cancel the large Doppler frequency shift.

Assuming the 250 kilocycle per second pilot signal is utilized as the intermodulating signal, the output signal from mixer 51 will be shifted 25 kilocycles per second plus the small frequency shift of 2.50 cycles per second. By utilizing the difference frequency at the output of mixer 51, the large Doppler frequency shift has been eliminated. Thus, the output signal from mixer 51 will have a frequency between 275 kilocycles per second and 975 kilocycles per second with no large Doppler shift appearing thereon. The information-carrying signals may then be separated into their discrete frequency bands by filters 52, 53 and 54. Thereafter, each band of information-carrying signals may be intermodulated with a selected signal having a small frequency shift equal to the average frequency shift in that particular band of signals. Thus, as in FIG. 2, the output of each channel may be changed to a common frequency band of 100 kilocycles per second to 300 kilocycles per second wherein there is a negligible frequency shift of one cycle per second at each end of the band and of 0 cycle per second at the midpoint of the frequency band.

What is claimed is:

1. In a communication system having a variable path length between a receiving terminal and a transmitting terminal, a single sideband of a modulated carrier signal coupling said terminals, said carrier signal being modulated by a first pilot signal, a second pilot signal, and a band of information-carrying signals, said single sideband being shifted in frequency, a filter means connected to said receiving terminal for separating said pilot signals and said band of information-carrying signals and for coupling them into individual channels, means connected to said individual channels for combining said first and said second pilot signals to remove the frequency shift common to said pilot signals, means connected to the output of said combining means for increasing the frequency of the combined pilot signals to a preselected frequency, and means for intermodulating the pilot signal in one of said channels and said increased combined pilot signal and said band of information-carrying signals.

2. In a communication system having a variable path length between a transmitting terminal and a receiving terminal, a single sideband of a modulated carrier signal coupling said terminals, said carrier signal being modulated by a first pilot signal, a second pilot signal, and a plurality of information-carrying signals occupying discrete frequency bands, said single sideband being shifted in frequency by an amount determined by the rate of change of said path length between said terminals and the frequency of said carrier signal and the frequencies of said modulating signals, said receiving terminal comprising a filter means for separating each frequency band and each pilot signal and coupling them to individual channels, means for combining said first and said second pilot signals to remove the frequency shift determined by the frequency of said carrier signal, a plurality of multiplier circuits connected in the output circuit of said combining means for changing the combined frequency of the pilot signals to preselected frequencies, and means in each information-carrying channel for combining a preselected pilot signal frequency, said second pilot signal and the information-carrying signal in that channel.

3. In a communication system having a variable path length between a transmitting terminal and a receiving terminal, a single sideband of a modulated carrier signal coupling said terminals, said carrier signal being modulated by a first pilot signal, a second pilot signal and a plurality of information-carrying signals occupying discrete frequency bands, said single sideband being shifted in frequency by an amount determined by the rate of change of said path length between said terminals and the frequency of said carrier signal and the frequencies of said modulating signals, said receiving terminal comprising means for converting said single sideband to said modulating frequencies, means for separating said first and said second pilot signals and said bands of information-carrying signals and coupling them to individual channels, means for intermodulating said pilot signals, multiplier circuits located in each information-carrying signal channel and connected in circuit with the output of said intermodulating means for increasing the combined frequency of said pilot signals to preselected frequencies, an oscillator for generating a signal having a preselected frequency, means in each information-carrying signal channel for combining the output of said oscillator and the output of said multiplying circuit located in that particular channel, and means for intermodulating the output signal from said combining means, one of said pilot signals and the band of information-carrying signals in that particular channel.

4. In a communication system having a variable path length between a transmitting terminal and a receiving terminal, a single sideband of a modulated carrier signal coupling said terminals, said carrier signal being modulated by a first pilot signal, a second pilot signal and a plurality of information-carrying signals occupying discrete frequency bands, said single sideband being shifted in frequency by an amount determined by the rate of change of said path length between said terminals and the frequency of said carrier signal and the frequencies of said modulating signals, said receiving terminal comprising a means for converting said single sideband to said modulating frequencies, the output signal of said converting means including the frequency shift of said single sideband, a first filtering means connected to said converting means for separating said first and said second pilot signal from said bands of information-carrying signals, a first means for intermodulating one of said pilot signals with the bands of information-carrying signals to remove the frequency shift common to all signals, a second filtering means responsive to said first intermodulating means for separating each band of information-carrying signals and for coupling them to individual channels, a second means for intermodulating said first and said second pilot signals to remove the frequency shift common to said pilot signals, a plurality of multiplier circuits responsive to said second intermodulating means for increasing the output of said second intermodulating means to preselected frequencies having a frequency shift equal to the average frequency shift of a particular band of information-carrying signals, an oscillator for generating a preselected frequency, a third means located in each information-carrying signal channel for intermodulating the output of said oscillator and the output of a particular multiplier circuit, and a fourth means located at each information-carrying signal channel for intermodulating the output of said third intermodulating means and the band of information-carrying signals in that particular channel.

5. In a single sideband suppressed carrier communication system which proportionately shifts each frequency of a sideband comprising a carrier frequency modulated by an information-carrying band of frequencies and a pair of pilot frequencies remote from said information frequencies, a receiving terminal including means for separating said information band from each of said pilot frequencies, said separated information band having a frequency shift at each component frequency equal to the sum of a first shift due to said carrier frequency and a second shift due to said component frequency, means connected to said separating means for deriving from said pilot frequencies a signal having a frequency shift equal to said second shift at a selected component frequency, and means connected to said signal deriving means for canceling said first shift common to all of said information band frequencies and for canceling said second shift at said selected component frequency including means for combining said derived signal, one of said pilots and said information band.

6. In a single sideband suppressed carrier communication system which shifts each sideband frequency by an amount proportional to said frequency, a transmitting terminal including means for modulating a carrier frequency with a band of information-carrying frequencies and a pair of pilot frequencies remote from said information band of frequencies, a receiving terminal comprising filter means for separating into separate channels said pilot frequencies as shifted and said information band frequencies having a shift in each component frequency equal to the sum of a first shift due to said carrier frequency and a second shift due to said component frequency, means connected to said filter means for deriving from said pilot frequencies a signal having a frequency shift equal to said second shift at a selected component frequency including means for intermodulating said pilot frequencies and means for multiplying said intermodulated signal frequency, and means connected to said signal deriving means for canceling said first and second shift at said selected frequency and for canceling said first shift and substantially reducing said second shift throughout said information band including means for intermodulating said information band, said derived signal and one of said pilot signals.

References Cited by the Examiner

UNITED STATES PATENTS

| | | | |
|---|---|---|---|
| 2,724,742 | 11/55 | Chestnut | 325—49 |
| 2,849,605 | 8/58 | Fickett et al. | 325—50 |
| 2,871,295 | 1/59 | Stachiewicz | 325—63 |
| 2,974,222 | 3/61 | Lawson | 325—17 |
| 3,068,416 | 12/62 | Meyer | 325—50 |

DAVID G. REDINBAUGH, *Primary Examiner.*